United States Patent [19]
Zollmann, Jr.

[11] 3,745,279
[45] July 10, 1973

[54] CONTACT SWITCH

[75] Inventor: William J. Zollmann, Jr., Foristell, Mo.

[73] Assignee: Wagner Electric Corporation, Newark, N.J.

[22] Filed: June 26, 1972

[21] Appl. No.: 266,077

[52] U.S. Cl. .......................... 200/80 R, 200/166 CT
[51] Int. Cl. ............................................ H01h 35/10
[58] Field of Search .................. 200/166 R, 166 CT, 200/80 R

[56] References Cited
UNITED STATES PATENTS

| | | | |
|---|---|---|---|
| 2,974,302 | 3/1961 | Ellis | 200/166 CT |
| 2,974,212 | 3/1961 | Stolle et al. | 200/166 CT |

Primary Examiner—Herman J. Hohauser
Attorney—Joseph E. Papin

[57] ABSTRACT

A switch mechanism for controlling a start winding circuit of an electric motor is provided with a support plate having a contact thereon for connection in said circuit, and a current carrying switch member is pivotally mounted on said support plate for circuit making and breaking engagement with said contact. A tab is integrally provided on the switch member extending through a slot in the support plate and defining with one side of said support plate a pivot for said switch member, and a quick disconnect device for connection in said circuit is connected in displacement preventing and current transmitting engagement with said tab adjacent to the other side of said support plate including a portion for abutting engagement with said support plate other side adjacent to the slot.

14 Claims, 6 Drawing Figures

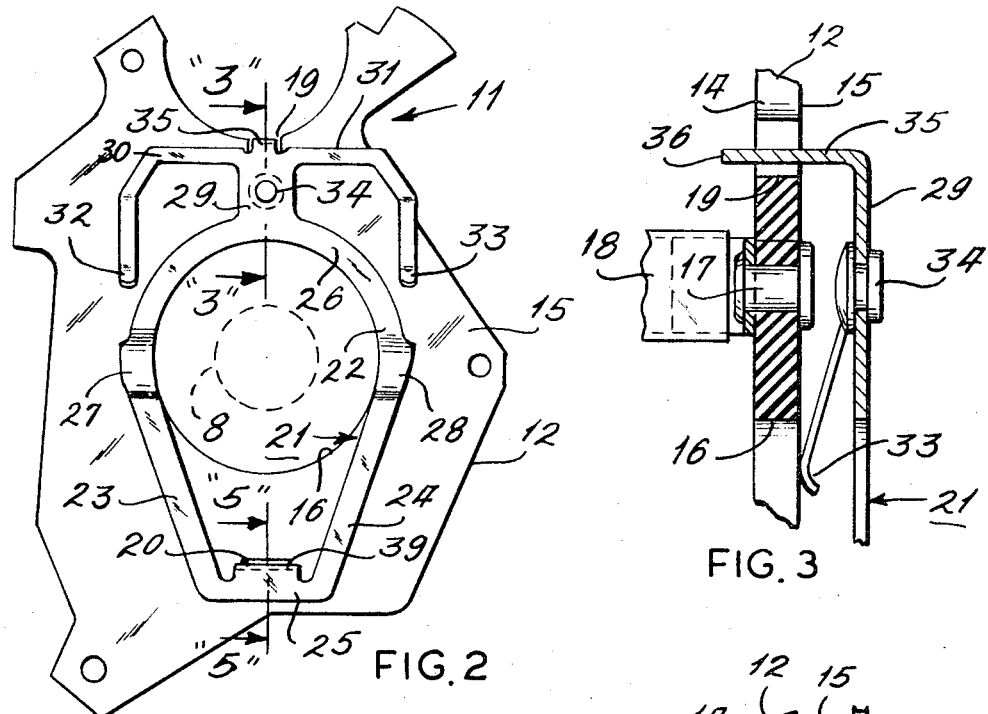
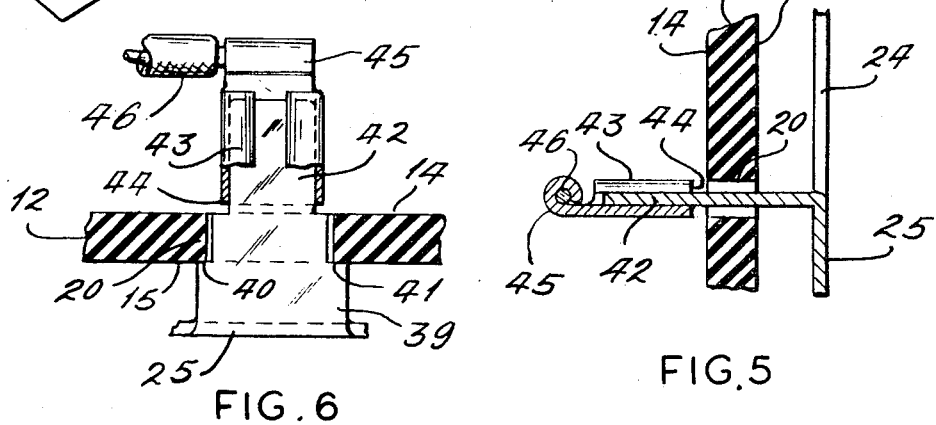
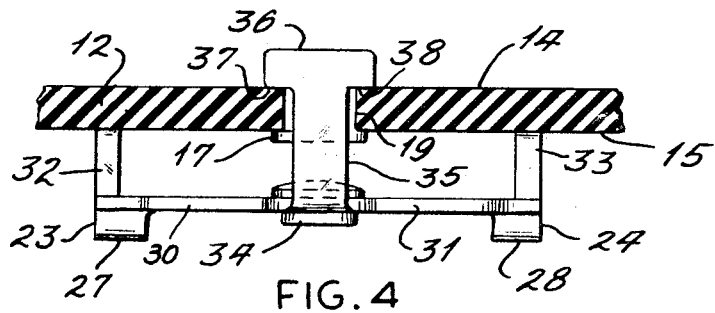

CONTACT SWITCH

FIELD OF THE INVENTION

This invention relates generally to electric motors and in particular to a switch mechanism for controlling the start winding circuit of said motor.

BACKGROUND OF THE INVENTION

In the past, switches have been utilized in electric motors to control th start winding circuits thereof by short circuiting or breaking the circuit connected with the auxiliary or start windings of said motor, and such short circuiting actuation of said switches was effected upon the driving engagement of said switches by governor devices in response to a predetermined motor or shaft speed. An object of the present invention is to provide a switch mechanism for controlling the start winding circuit of an electric motor which is simple in construction, reliable in operation, and simply and economically manufactured and assembled, and this, as well as other objects and advantageous features of the present invention, will become apparent in the specification which follows.

SUMMARY OF THE INVENTION

Briefly, the present invention includes a switch mechanism for controlling the start winding circuit of an electric motor having a support member with a contact on one side thereof for connection in said circuit, a slot in said support member, and a current carrying switch member for circuit making and breaking engagement with said contact including tab means extending through said slot and defining with said support member one side a pivot for said switch member, and quick disconnect means on the other side of said support plate and connected in displacement preventing and current transmitting engagement with said tab means.

RELATED PATENTS

This application is related to U.S. Pat. No. 3.185,788 issued to William J. Zollmann, Jr., and assigned to the common assignee of this patent application which is a patentably distinct improvement.

BRIEF DESCRIPTION OF THE DRAWINGS

In the drawings which illustrate an embodiment of the present invention and wherein like numerals refer to like parts wherever they occur:

FIG. 2 is a plan view illustrating the switch mechanism and support member therefor of FIG. 1;

FIG. 3 is an enlarged partial sectional view taken along line "3—3" of FIG. 2;

FIG. 4 is a top elevational view partially in cross-section of the switch mechanism and support plate of FIG. 2;

FIG. 5 is an enlarged partial sectional view taken along line "5—5" of FIG. 2; and FIG. 6 is a bottom elevational view partially in cross-section of the switch mechanism and support plate of FIG. 2.

DETAILED DESCRIPTION OF THE INVENTION

Figure 1:
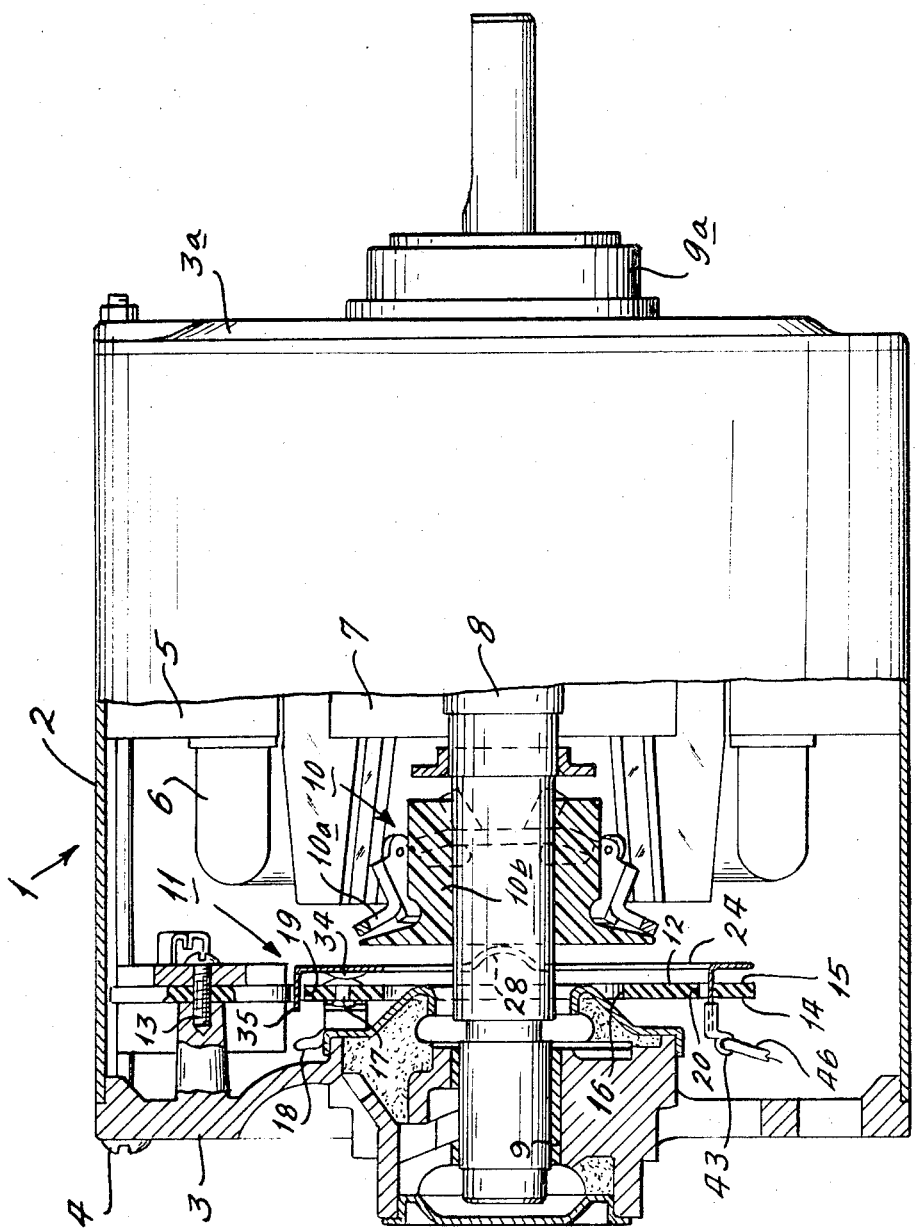
FIG. 1 is a partial sectional view of an electric motor showing the switch mechanism embodied in the present therein.

Referring now to the drawings in detail and in particular to FIGS. 1 and 2, an electric motor 1 is provided with an annular housing 2 having opposed end plates or housing members 3, 3a connected therewith by suitable means, such as a plurality of through-bolts 4. An annular slotted stator 5 having windings 6 therein is disposed in the housing 2, and an armature or rotor 7 is rotatable in said stator being drivingly connected with a rotatable shaft 8 which is suitably journaled in bearings 9, 9a respectively provided in the end plates 3, 3a as is well-known in the art. A governor device indicated generally at 10, such as that described in detail in the co-pending application of Earl A. Moody filed on or about June 9, 1972, is mounted on the shaft 8 for concerted rotation therewith, and said governor device includes fly-weight arms 10a movable radially outwardly of said shaft upon a predetermined rotational speed thereof for axially driving a governor hub 10b on said shaft which in turn drives or controls the actuation of a switch mechanism, indicated generally at 11 to make and break the circuit for the starting windings (not shown) of the motor 1.

The switch mechanism 11 is provided with a mounting or support plate 12 of insulating material which is fixedly connected by suitable means, such as a plurality of screws 13 with the end plate housing 3 adjacent to the bearing 9, and said support plate is provided with opposed sides or portions 14, 15 having an axially extending bore or aperture 16 intersecting therewith to accommodate the motor shaft 8 which extends coaxially therethrough. A stationary contact 17 is disposed on the side 15 of the support plate 12, and a lead 18 is electrically connected between said stationary contact and a motor starting switch (not shown) for energizing the motor 1, as is well-known in the art. An open-ended slot or groove means 19 is provided in the upper peripheral portion of the support plate 12 intersecting with the opposed sides 14, 15 thereof adjacent to and above the stationary contact 17, and another slot or groove means 20 is diametrally spaced with respect to the motor shaft 8 from the slot 19 extending through said support plate adjacent to the lower end portion thereof and intersecting with said opposed sides.

A current carrying switch member 21 is provided with a body portion 22 of resilient material, such as spring steel or the like, having opposed leg or side portions 23, 24 integrally connected between a lower end portion 25 and an upper yoke portion 26, and said leg portions are respectively provided with integrally formed arcuate or driven portions 27, 28 drivingly connected with the governor hub 10b. An extension or contact carrying portion 29 is integrally connected between the yoke 26 and a pair of oppositely or laterally extending resilient or spring arms 30, 31 having integral, depending spring portions 32, 33 in resilient or biasing engagement with the support plate side 15 to normally urge the switch body 22 away from said support plate side, as also shown in FIGS. 3 and 4, and a movable or switch member contact 34 is fixedly connected in current carrying relation with the extension 29 for engagement with the stationary contact 17 to make and break the circuit for the starting windings (not shown) of the motor 1.

A tab or retaining member 35 is integrally connected with the body extension 29 depending substantially normal thereto and extending through the upper slot 19 of the support plate 12. A free end portion 36 is provided on the tab 35 adjacent to the support plate side 14, and opposed abutments or shoulders 37, 38 are provided on said free end portion being urged toward abutting or displacement preventing engagement with the support plate side 14 about the slot 19 in response to the spring force exerted on the switch member 21 by the spring arms 32, 33. Another tab or retaining member 39 is integrally connected with the lower end 25 of the switch body 22 depending substantially normal thereto and extending through the lower slot 20 of the supprt plate 12, as shown in FIGS. 5 and 6. Opposed pivoting portions, such as the abutments or shoulders 40, 41 are provided on the tab 39 for pivoting and rocking engagement with the support plate side 15 adjacent to the lower slot 20, and a free or connecting end portion 42 is provided on the tab 39 adjacent to the support plate side 14. The connecting end 42 of the tab 39 is releasably received in current carrying relation with a quick disconnect device 43 of a type well-known in the art, and said quick disconnect device is provided with an abutment end or portion 44 for displacement preventing engagement with the support plate side 14 about the lower slot 20 therein and a lead receiving portion 45 electrically connected with a lead 46 from the starting winding circuit (not shown) of the motor 1.

Prior to the assembly of the end plate 3 with the housing 2, the switch member 21 is mounted on the support plate 12 by inserting the tab 35 vertically downwardly into the upper slot 19 in said support plate and then inserting the tab 39 through the lower slot 20 in said support plate. Of course, the engagement of the lower tab 39 with the support plate lower slot 20 predeterminately limits vertical movement of the switch member 21 on the support plate 12 thereby maintaining the upper tab 35 from vertical displacement from the upper slot 19. With the tabs 35, 39 respectively inserted through the slots 19, 20, the spring arms 30, 31 are engaged with the support plate side 15 exerting forces on the switch member 21 in a direction to displace said tabs from said slots; however, such spring arm forces urge the upper tab abutments 37, 38 into displacement preventing engagement with the support plate side 14 about the upper slot 19. When the lower tab 39 is positioned in the support plate lower slot 20, the tab extension 42 protrudes therethrough adjacent to the support plate side 14, and the quick disconnect device 43 is then manually inserted into releasable engagement with said tab extension with the abutment end 44 of said quick disconnect device disposed for abutting engagement with the support plate side 14 about the lower slot 20 to prevent the displacement of the lower tab 39 from the lower slot 20 in response to the aforementioned forces exerted by the spring arms 30, 31 on the switch member 21.

With the switch member 21 mounted on the support plate 12 of the end bell 3, as previously described, said end bell is then assembled on the housing 2 and shaft 8 as shown in FIG. 1. When the end bell 3 is so assembled, the arcuate portions 27, 28 of the switch member legs 23, 24 are urged into engagement with the governor hub 10b, and such engagement urges the pivotal abutments 40, 41 into pivoting and rocking engagement with the support plate side 15 and urges the switch member contact 34 into circuit making engagement with the stationary contact 17 against the forces of the spring arms 30, 31 acting on the switch member 21.

In the operation of the motor 1, when current is applied to energize the motor windings 6, such current also flows through the lead 18, the engaged stationary and switch member contacts 17, 34, the switch member 21, and the quick disconnect device to the start winding lead 46 to effect energization of the start winding circuit (not shown) of said motor. When the rotor and shaft 7, 8 attain a predetermined speed in response to the energization of the windings 6, the fly-weights 10a of the governor device 10 are moved radially outwardly and drive the hub 10b rightwardly on said shaft toward a switch opening position, as well-known in the art. Upon the movement of the hub 10a to its switch opening position, the forces of the spring arms 30, 31 of the switch member 21 acting thereon are effective to pivotally urge said switch member about the pivoting engagement of the lower tab pivot portions 40, 41 with the support plate side 15 to maintain the arcuate portions 27, 28 of the switch member legs 23, 24 in following engagement with the governor hub 10b wherein the switch member contact 34 is disengaged from the stationary contact 17, as shown in FIGS. 3 and 4, to break the start winding circuit (not shown) of the motor 1.

Upon de-energization of the motor 1, the governor fly-weights 10b move radially inwardly toward their original positions when the rotational speed of the rotor and shaft 7, 8 decreases to the aforementioned predetermined speed to axially drive the hub 10b leftwardly on said shaft toward its original position, and such leftward movement of said hub in turn pivotally drives the switch member about the pivotal engagement of the pivot portions 40, 41 with the support plate side 15 toward its original position re-engaging the switch member contact 34 with the stationary contact 17.

If for some reason, such as misalignment of component parts, tolerance variances, or switch and governor wobble or the like, only one of the arcuate portions 27, 28 of the switch member legs 23, 24 is operatively engaged with the governor hub 10b, it should be noted that only one of the lower tab pivot portions 40, 41 may be pivotally engaged with the support plate side 15 about the lower slot 20 wherein the switch member 21 is rockable about said one low tab pivot portion to ensure proper and positive engagement between the stationary and switch member contacts 17, 34.

From the foregoing, it is now apparent that a novel switch mechanism 11 for an electric motor 1 is disclosed and that changes or modifications as to the precise configuration, shapes and details of the construction set forth in the disclosure by way of illustration may be made by those skilled in the art without departing from the spirit of the invention.

What I claim is:

1. A switch mechanism for controlling a start winding circuit of an electric motor comprising a support plate having a slot therein, a stationary contact on one side of said support plate for connection in said circuit, a current carrying switch member having another contact thereon for circuit making and breaking engagement with said stationary contact, means for pivotally mounting said switch member on said support plate one side including tab means on said switch member extending through said slot and defining with said support plate one side a pivot for said switch member, a quick disconnect device releasably connected in current transmitting engagement with said tab means adjacent to the other side of said support plate and adapted for abutting engagement with said support plate other side about said slot means to obviate displacement therefrom of said tab means, said switch member being movable on said pivot to connect said other contact in circuit making engagement with said stationary contact in response to an applied force on said switch member, another slot in said support plate, and other tab means on said switch member disposed in said slot for abutting engagement with said support plate other side.

2. A switch mechanism according to claim 1, comprising resilient means connected between said switch member and support plate and normally urging said other contact toward a circuit breaking position disengaged from said stationary contact.

3. A switch mechanism according to claim 2, wherein said resilient means include at least one spring arm integral with said switch member and engaged with said support plate one side.

4. A switch mechanism according to claim 1, comprising an abutment on said other tab for engagement with said support plate other side adjacent to said other slot.

5. A switch mechanism according to claim 2, comprising, an abutment means on said other tab means urged toward engagement with said support plate other side adjacent to said other slot by the force of said resilient means and defining the circuit breaking position of said other contact.

6. A switch mechanism according to claim 1, wherein said first name tab means includes abutment means engaged with said support plate one side to define said pivot, and extension means on said tab means extending through said slot for connection with said quick disconnect device.

7. A switch mechanism for controlling a start winding circuit of an electric motor comprising a support plate having a slot therein, a stationary contact on one side of said support plate for connection in said circuit, a current carrying switch member having another contact thereon for circuit making and breaking engagement with said stationary contact, means for pivotally mounting said switch member on said support plate one side including tab means on said switch member extending through said slot and defining with said support plate one side a pivot for said switch member, a quick disconnect device releasably connected in current transmitting engagement with said tab means adjacent to the other side of said support plate and adapted for abutting engagement with said support plate other side about said slot means to obviate displacement therefrom of said tab means, said switch member being movable on said pivot to connect said other contact in circuit making engagement with said stationary contact in response to an applied force on said switch member, resilient means connected between said switch member and support plate normally urging said other contact toward a circuit breaking position disengaged from said stationary contact, another slot in said support plate, other tab means on said switch member extending through said other slot, abutment means on said other tab means urged toward engagement with said support plate other side by the force of said resilient means and defining the circuit breaking position of said other contact, and said first named tab means incuding a pivot portion on said support plate one side and integral with said switch member, other abutment means on said pivot portion engaged with said support plate one side to define therewith said pivot, and extension means integral with said pivot portion and extending through said first named slot into displacement preventing and current transmitting engagement with said quick disconnect device.

8. A switch mechanism according to claim 7, wherein said switch member includes opposed end portions respectively interconnected between opposed side portions, said other contact and other tab means being connected with one of said opposed end portions and said first named tab means being connected with the other of said opposed end portions, and said resilient means including opposed spring arms having one end integrally connected with said switch member adjacent to said one opposed portion thereof and the other opposed end of said spring arms being in biasing engagement with said support plate one side.

9. A switch mechanism according to claim 8, comprising arcuate portions integrally formed in said opposed side portions and extending away from the plane of said support plate for receiving the applied force, respectively.

10. A switch mechanism according to claim 9, wherein said motor includes a rotatable shaft extending through the opposed end and side portions of said switch member, and a governor device concertedly rotatable with said shaft and including means axially movable thereon upon a predetermined rotational speed of said shaft to exert the applied force on said arcuate portions and actuate said switch member.

11. A switch mechanism for controlling a start winding circuit of an electric motor comprising a support plate fixedly mounted within said motor and having opposed sides, a pair of spaced slots in said support plate intersecting with the opposed sides thereof, one of said slots connecting with the periphery of said support plate, a stationary contact on one of the opposed sides of said support plate for connection in said circuit, a current carrying switch member including a body having a pair of opposed end portions respectively integrally interconnected between a pair of opposed side portions, a pair of oppositely extending spring arms having one end integrally connected with said body adjacent to one of said opposed end portions and the other end thereof in biasing engagement with said support plate one side to normally urge said body one end portion away from said support plate one side, another contact on said body one end portion for circuit making and breaking engagement with said stationary contact and urged toward a circuit breaking position disengaged from said stationary contact by the force of said spring arms, a first tab member substantially normal to said body extending through said one slot having one end integrally connected with said body one end portion and a free end adjacent to the other opposed side of said support plate, first abutment means on said first tab member adjacent to said free end thereof and urged toward engagement with said support plate other side adjacent to said one slot by the force of said resilient arms, a second tab member substantially normal to said body including a pivot portion integrally connected with the other end portion of said body, second abutment means on said pivot portion engaged with said support plate one side adjacent to the other of said slots and defining with said support plate other side a pivot for said switch member, a reduced extension integrally connected with said pivot portion and extending through said other slot, a quick disconnect device for connection in said circuit disposed adjacent to said support plate other side and releasably connected in current transmitting engagement with said extension, and third abutment means on said quick disconnect device for engagement with said support plate other side adjacent to said other slot to prevent displacement of said second tab member therefrom, said switch member being movable on said pivot against the force of said resilient arms to connect said other contact in circuit making engagement in response to an applied force on at least one of said body side portions.

12. A switch mechanism according to claim 1, wherein said switch member includes opposed end portions respectively interconnected between opposed side portions, said other contact and other tab means being connected with one of said opposed end portions and said first named tab means being connected with the other of said opposed end portions, and said resilient means including opposed spring arms having one end integrally connected with said switch member adjacent to said one opposed portion thereof and the other opposed end of said spring arms being in biasing engagement with said support plate one side.

13. A switch mechanism according to claim 12, comprising arcuate portions integrally formed in said opposed side portions and extending away from the plane of said support plate for receiving the applied force, respectively.

14. A switch mechanism according to claim 13, wherein said motor includes a rotatable shaft extending through the opposed end and side portions of said switch member, and a governor device concertedly rotatable with said shaft and including means axially movable thereon upon a predetermined rotational speed of said shaft to exert the applied force on said arcuate portions and actuate said switch member.

* * * * *